United States Patent
Filla (10) Patent No.: US 8,200,400 B2
(45) Date of Patent: Jun. 12, 2012

(54) METHOD FOR OPERATING A WORKING MACHINE AND A WORKING MACHINE WITH AN IMPROVED ABILITY TO MEET TRANSIENT LOADS

(75) Inventor: Reno Filla, Eskilstuna (SE)

(73) Assignee: VolvoConstruction Equipment AB, Eskilstuna (SE)

( * ) Notice: Subject to any disclaimer, the term of this patent is extended or adjusted under 35 U.S.C. 154(b) by 482 days.

(21) Appl. No.: 12/443,908

(22) PCT Filed: Oct. 6, 2006

(86) PCT No.: PCT/SE2006/001140
§ 371 (c)(1),
(2), (4) Date: Apr. 1, 2009

(87) PCT Pub. No.: WO2008/041890
PCT Pub. Date: Apr. 10, 2008

(65) Prior Publication Data
US 2010/0036568 A1     Feb. 11, 2010

(51) Int. Cl.
*G06F 7/70*     (2006.01)
*G06F 19/00*     (2006.01)
*G06G 7/00*     (2006.01)
*G06G 7/76*     (2006.01)

(52) U.S. Cl. .......................................................... 701/50

(58) Field of Classification Search .................... 701/50; 318/60
See application file for complete search history.

(56) References Cited

FOREIGN PATENT DOCUMENTS
EP     1505717 A1     2/2005
EP     1571352 A1     9/2005

OTHER PUBLICATIONS
International Search Report for corresponding International Application PCT/SE2006/001140.

*Primary Examiner* — Christopher J. Novosad
(74) *Attorney, Agent, or Firm* — WRB-IP LLP (57) ABSTRACT

A working machine and a method for operating a working machine are provided. The working machine includes a power source and a plurality of driving wheels; a working hydraulic system including at least one hydraulic pump powered by the power source for moving an implement on the working machine and/or for steering the working machine; a transmission line arranged between the power source and the driving wheels for transmitting torque from the power source to the driving wheels. The method includes detecting at least one operational parameter indicative of a load exerted on the working hydraulic system, determining if torque needs to be added, in addition to a torque delivered by the power source, on the basis of a magnitude of the detected operational parameter in order to reduce the a load on the power source, and adding torque in case additional torque is determined to be needed.

35 Claims, 4 Drawing Sheets

METHOD FOR OPERATING A WORKING MACHINE AND A WORKING MACHINE WITH AN IMPROVED ABILITY TO MEET TRANSIENT LOADS

BACKGROUND AND SUMMARY

The invention relates to a method for operating a working machine.

The invention is applicable on working machines within the field of industrial construction machines, in particular wheel loaders. Thus, the invention will be described with respect to a wheel loader. However, the invention is by no means limited to a particular working machine. On the contrary, the invention may be used in a plurality of heavy working machines, e.g. articulated haulers, trucks, bulldozers and excavators.

Wheel loaders are generally provided with an internal combustion engine, a transmission line, a gearbox, driving wheels and a working hydraulic system.

The combustion engine provides power to the different functions of the wheel loader. In particular, the combustion engine provides power to the transmission line and to the working hydraulic system of the wheel loader.

The transmission line transfers torque from the combustion engine to the gearbox, which in turn provides torque to the driving wheels of the loader. In particular, the gearbox provides different gear ratios for varying the speed of the driving wheels and for changing between forward and backward driving direction of the wheels.

The working hydraulic system is used for lifting operations and/or for steering the wheel loader. For this purpose there are at least one hydraulic working cylinder arranged in the wheel loader for lifting and lowering a lifting arm unit, on which a bucket or other type of attachment or working tool is mounted for example forks. By use of another hydraulic working cylinder, the bucket can also be tilted or pivoted. Further hydraulic cylinders known as steering cylinders are arranged to turn the wheel loader by means of relative movement of a front and rear body part of the wheel loader.

To protect the combustion engine of a wheel loader from sudden rapid changes in the working conditions of the gearbox and the driving wheels it is common to provide the transmission line with a hydrodynamic torque converter or similar arranged between the combustion engine and the gearbox. The hydrodynamic torque converter provides an elasticity that enables a very quick adaptation of the output torque to the changes in the working conditions of the gearbox and the driving wheels. In addition, a torque converter provides an increased torque during particularly heavy working operations, e.g. during acceleration of the wheel loader.

For example, if a wheel loader without the elasticity of a torque converter or similar is driven into an obstacle so that the vehicle stops this will also stop the combustion engine, since the engine in such designs is rigidly and unyieldingly connected to the rotation of the driving wheels. However, this will not happen if a torque converter or similar is arranged between the engine and the driving wheels or more preferably between the engine and the gear box. On the contrary, if the driving wheels of the wheel loader stops this causes the output side (the turbine side) of the torque converter (the turbine side) to stop whereas the input side (the pump side) continues to rotate together with the engine. The engine will experience a larger internal resistance from the torque converter but it will not come to a standstill.

However, the elasticity of a hydrodynamic torque converter or similar is not present between the working hydraulic system and the combustion engine. On the contrary, the combustion engine provides power to the hydraulic pump or pumps of the working hydraulic system in a more or less direct manner, e.g. by means of a mechanical gear wheel transmission connected between the output shaft of the engine and the input shaft of the pump or pumps. In other words, a rapid increase of the load on the working hydraulic system is transmitted to the combustion engine without any significant attenuation. Naturally, this may cause the combustion engine to stall or cause the power from the combustion engine to be fully consumed by the hydraulic system leaving the transmission line without any significant power. This may provide the operator of the wheel loader with the highly undesired impression that the engine has become too weak to move the wheel loader in an operable manner.

One way of solving the problem of meeting a sudden rapid increase of the load on the working hydraulic system is to run the combustion engine of the wheel loader at the higher end of its speed range. This provides a power margin which makes it easier for the combustion engine to meet a rapid load increase on the hydraulic system, e.g. time to recover by increasing the throttle. However, in general a higher rotational speed leads to significantly increased losses and thus increased fuel consumption. Therefore, with regards to fuel consumption it is better to run the combustion engine at lower rotational speeds. However, this will give a significantly reduced margin for the combustion engine to recover from sudden rapid increases of the load on the working hydraulic system.

In addition, to ensure that the hydraulic functions are equally fast at the lower rotational speeds, i.e. to ensure the same hydraulic flow at the lower rotational speeds, it is necessary to use larger pumps with higher displacement. A larger pump displacement requires a larger torque from the source driving the pump, i.e. from the combustion engine. In other words, if we move from higher rotational speeds towards lower rotational speeds for reducing losses and fuel consumption we will need hydraulic pumps with a higher displacement, which in turn leads to a higher torque load on the combustion engine. A higher torque load on the combustion engine at a lower rotational speed implies that the engine is utilized even harder. Hence, compared to the utilization at higher rotational speed for powering hydraulic pumps with a lower displacement it has now become even more difficult for the combustion engine to recover from a rapid increase of the load on the working hydraulic system.

Therefore, when designing a modern combustion engine for a working machine such as a wheel loader it is desirable to obtain high output torques at low rotational speeds and to obtain quick reactions on sudden rapid increase of the load on the working hydraulic system. To this end it is common to employ various turbochargers or air compressors. However, these and other solutions for reinforcing the performance of a combustion engine are commonly in conflict with increasingly harder emission regulations, particularly with respect to exhaustion gases and visible smoke emanating from engine responses to sudden rapid increases of the load on the working hydraulic system.

If the performance of the combustion engine cannot be boosted we can always meet a sudden rapid increase of the load on the working hydraulic system by at least temporary reducing the load on the hydraulic system. This can be achieved by limiting the displacement for the hydraulic pumps involved for a short initial period. In this way the torque required from the combustion engine can be temporarily reduced giving the combustion engine time to recover, e.g. time to recover by increase the throttle in a controlled manner. However, limiting the displacement for the hydraulic pumps will result in a reduced hydraulic flow which provides the operator of a wheel loader with an unwanted reduction of the performance of the hydraulic system, e.g. a reduced lifting speed and/or delayed lifting when lifting the bucket.

Considering the above there is clearly a need for a working machine provided with an improved ability to meet a sudden rapid increase of the load on the working hydraulic system with no or a reduced need for reinforcing the combustion engine or reducing the performance of the working hydraulic system.

It is desirable to provide a method of the kind referred to in the introduction, which creates conditions for operating a working machine in a more effective way.

According to an aspect of the present invention, a method is provided for operating a working machine provided with: a power source and a plurality of driving wheels; a working hydraulic system comprising at least one hydraulic pump powered by the power source for moving an implement on the working machine and/or for steering the working machine; a transmission line arranged between the power source and the driving wheels for transmitting torque from the power source to the driving wheels.

The method is characterized by the steps of:
  detecting at least one operational parameter indicative of a load exerted on the working hydraulic system,
  determining if torque needs to be added, in addition to a torque delivered by the power source, on the basis of a magnitude of the detected operational parameter in order to reduce the a load on the power source,
  adding torque in case additional torque is determined to be needed.

Adding torque by means of the above method is clearly providing a working machine with an improved ability to meet a sudden rapid increase of the load on the working hydraulic system with no or at least a reduced need for reinforcing the power source or reducing the performance of the working hydraulic system.

This is particularly so if the torque is added upon the detection of a transient increase of the load on the working machine, since a transient increase poses a particular risk of overloading or stalling the power source.

It is preferred that the torque is added to the transmission line. This is due to the fact that the working hydraulic system of a working machine is typically receiving power from the transmission line, which in turn is powered by the power source of the working machine.

It is also preferred that the torque is added by means of at least one electric machine, since this enables a flexible and compact design. An electric machine can also be powered by means of a plurality of power sources (e.g. batteries, generators, fuel cells etc), which provides an increased freedom in the design. Moreover, electric machines react fast on commands to provide a large torque already at low rotational speeds, which is beneficial considering that a rather large torque may have to be supplied fairly fast.

In addition it is preferred that at least one electric machine is arranged upstream a transmission unit that is typically arranged in ordinary transmission lines, or upstream a gearbox that is likewise typically arranged in ordinary transmission lines. In this way the electric machine does not have to work in both clockwise and counter clockwise directions to accommodate for both a forward and a reverse driving direction selected by means of the gear box. Moreover, arranging the electric machine upstream the transmission unit enables a more direct torque support to the working hydraulic system, since the hydraulic system is typically receiving power from a point in the transmission line that is located upstream the transmission unit.

It is furthermore preferred that the load on the working hydraulic system is predicted by monitoring at least one input command to the working hydraulic system. The commands are typically issued before the hydraulic system responds to the commands. Monitoring the commands will therefore provide additional time to add torque if needed, i.e. additional time before the hydraulic system will actually require more power from the power source It is preferred that the invention is implemented in a working machine and in particular in a wheel loader, since a typical wheel loader is operated with loads on the transmission line and the working hydraulic system that affect the power source substantially simultaneously creating transient loads of extraordinary magnitude.

It is also desirable to provide a working machine of the kind referred to in the introduction, which creates conditions for a more effective operation.

According to another aspect of the present invention, a working machine is provided with: a power source and a plurality of driving wheels; a working hydraulic system comprising at least one hydraulic pump powered by the power source for moving an implement on the working machine and/or for steering the working machine; a transmission line arranged between the power source and the driving wheels for transmitting torque from the power source to the driving wheels.

In addition the working machine comprises:
  at least one detecting unit for detecting at least one operational parameter indicative of a load exerted on the working hydraulic system,
  at least one control unit for determining if torque needs to be added, in addition to a torque delivered by the power source, on the basis of a magnitude of the detected operational parameter in order to reduce the a load on the power source,
  at least one torque providing unit controlled by said control unit for adding torque in case additional torque is determined to be needed.

The working machine displays the same or similar advantages as the method described above.

Further advantages and advantageous features of the invention are disclosed in the
  following description.

DEFINITIONS

The term "electric machine" should be understood as a term for an electric motor and/or generator. The electric machine can be driven by electricity to supply an output torque to a shaft or be mechanically driven by receiving torque on a shaft for producing electricity.

The term "transmission unit" comprises hydraulic clutches, both hydrodynamic clutches such as torque converters and hydrostatic clutches, as well as mechanical clutches. Thus, "transmission unit" comprises both torque converters which can increase the torque and ordinary skid clutches without ability to increase the torque.

The term "transient load" on the hydraulic system refers to a sudden rapid increase of the load on the working hydraulic system of a working machine, e.g. a wheel loader.

The term "driving wheels" is meant to comprise vehicle wheels for direct engagement with the ground as well as vehicle wheels for driving a ground engaging member, such as tracks, crawlers or similar.

BRIEF DESCRIPTION OF THE DRAWINGS

A more detailed description of the present invention is given below with reference to a plurality of exemplifying embodiments as illustrated in the appended figures, in which.

DETAILED DESCRIPTION

Structure
A Wheel Loader

Figure 1:
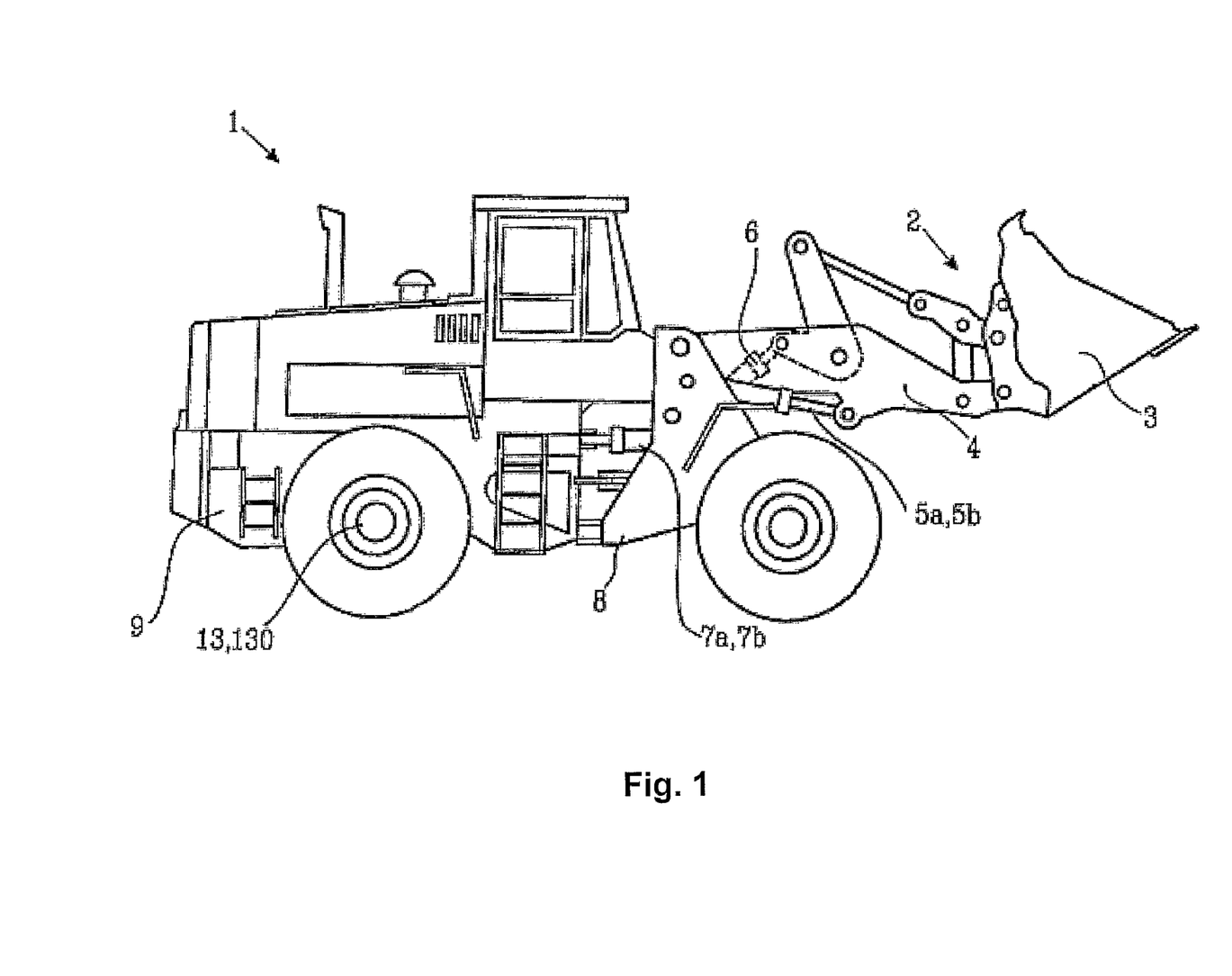
FIG. 1 is a lateral view illustrating a wheel loader having a bucket for loading operations, and a working hydraulic system for operating the bucket and steering the wheel loader.

FIG. 1 is an illustration of an exemplifying wheel loader 1 having an implement 2 in the form of a bucket 3. The bucket 3 is arranged on an arm unit 4 for lifting and lowering the bucket 3. The bucket 3 can also be tilted or pivoted relative to the arm unit 4. For this purpose the wheel loader 1 is provided with a working hydraulic system 140 comprising at least one hydraulic pump (not shown in FIG. 1) and working cylinders 5a, 5b, 6 for lifting and lowering of the arm unit 4, and for tilting or pivoting the bucket 3. In addition, the working hydraulic system comprises working cylinders 7a, 7b for turning the wheel loader I by means of relative movement of a front body 8 and a rear body 9. These features of the wheel loader 1 and variations thereof are well known to those skilled in the art and they need no further explanation.

A Hydraulic System

Figure 2:
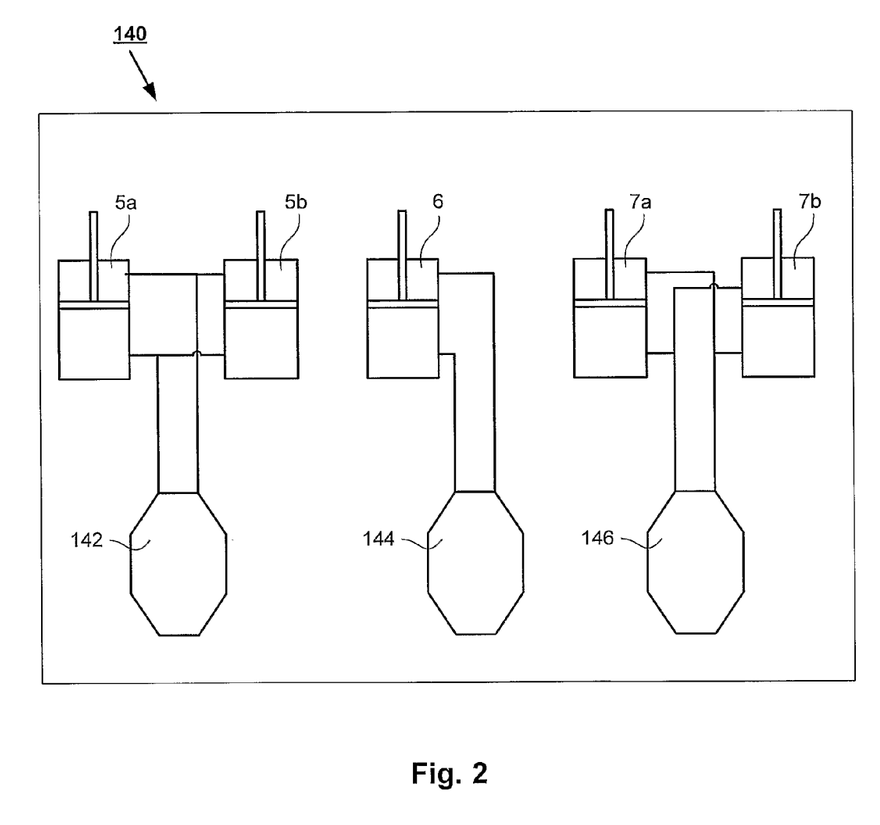
FIG. 2 is a schematic illustration of a working hydraulic system for a wheel loader.

FIG. 2 is a schematic illustration of an exemplifying working hydraulic system 140. The embodiment illustrated in FIG. 2 comprises two working cylinders known as lifting cylinders 5a, 5b. The lifting cylinders 5a, 5b are arranged for lifting and lowering the arm unit 4. A further working cylinder known as tilting cylinder 6 is arranged for tilting-in or tilting-out the bucket 3 relative to the arm unit 4. In addition, two working cylinders known as the steering cylinders 7a, 7b are arranged for steering the wheel loader 1. Three hydraulic pumps 142, 144, 146 supply the hydraulic cylinders with hydraulic oil. An operator of the wheel loader 1 can control the working cylinders by means of instruments connected to a control unit (not shown). Preferably the cylinders 5a, 5b, 6, 7a and 7b schematically illustrated in FIG. 2 correspond the cylinders 5a, 5b, 6, 7a and 7b shown in FIG. 1.

A Transmission Line

Figure 3:
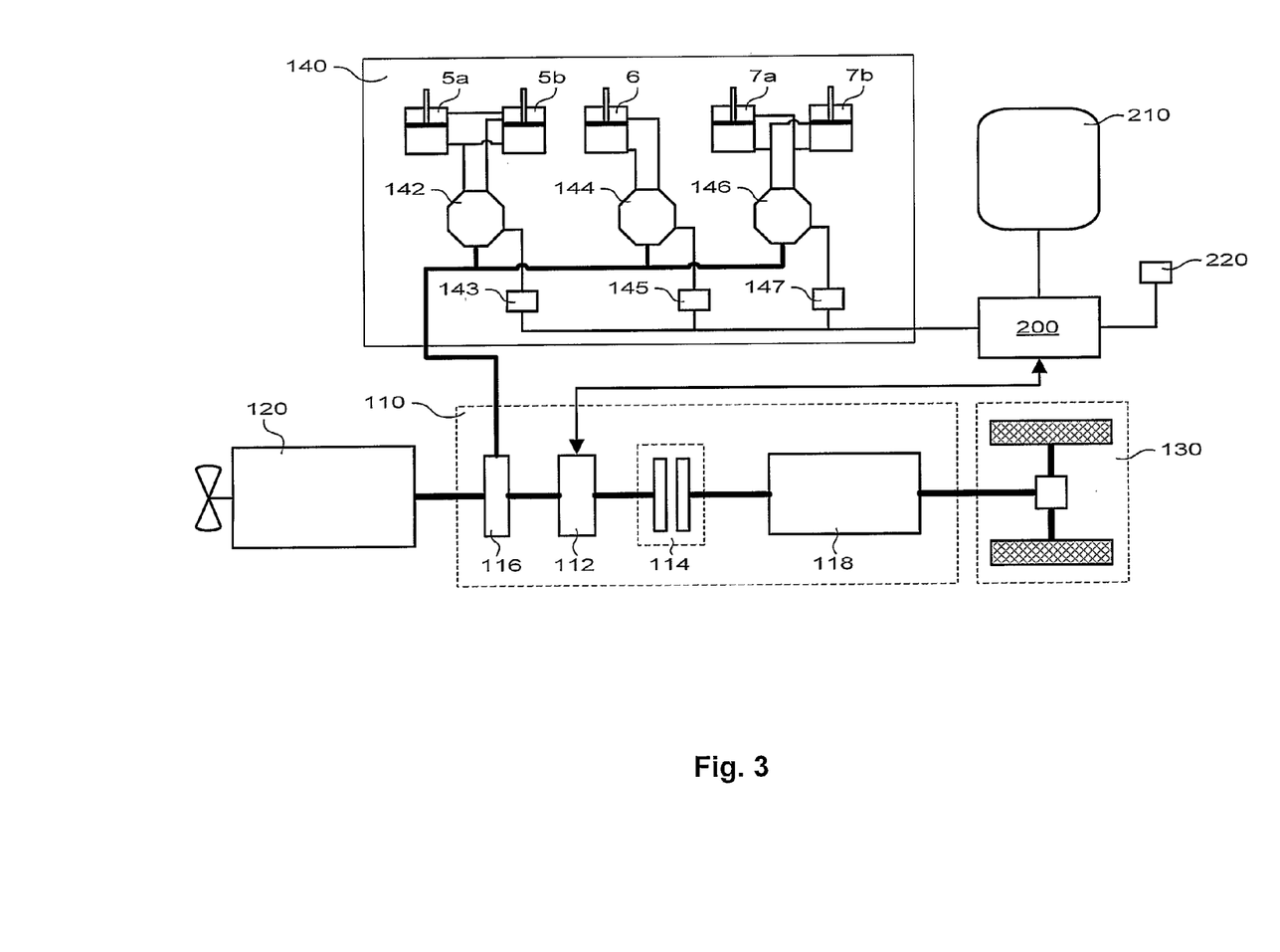
FIG. 3 is a schematic illustration of I.a. a transmission line of a wheel loader according to an embodiment of the present invention.

FIG. 3 is a schematic illustration of i.a. a transmission line 110 of a wheel loader 1 according to an embodiment of the present invention. The internal combustion engine 120 of the wheel loader 1 is arranged at one end of the transmission line 110 and the driving wheels 130 of the wheel loader 1 are arranged at the other end of the transmission line 110. In other words, the combustion engine 120 is arranged to supply torque to the driving wheels 130 via the transmission line 110. Preferably the transmission line 110 comprises a gearbox 118 for varying the speed of the driving wheels 130 of the wheel loader 1 and for changing between forward and backward driving direction of the wheels 130. The gearbox 118 may e.g. be an automatic gearbox implying that there must not necessarily be a clutch (not shown) between the gearbox 118 and the driving wheels 130, which is common in case of a manual gearbox.

The transmission line 110 is further provided with a transmission unit 114 for reducing the mechanical interaction between the internal combustion engine 120 and the driving wheels 130, i.e. for providing slipping or skidding or even for temporally disengaging the combustion engine 120 from the driving wheels 130. The main purpose is to protect the engine 120 from sudden rapid changes in the working conditions of the gearbox 118 and the driving wheels 130. The transmission unit 114 is preferably a hydraulic clutch of the type called hydrodynamic torque converter. As is well known, a torque converter is adapted to increase the input torque applied to the converter. The output torque can be in the interval of e.g. 1-3 times the input torque. The torque converter may also have a free wheel function and/or a lock-up function providing a direct operation without any increased torque. In case of a lock-up function it is preferred that the lock-up state provides a fixed transmission ratio of substantially 1:1. Naturally, other types of transmission units are conceivable for providing a reduced mechanical interaction between the combustion engine 120 and the driving wheels 130, e.g. a skid clutch without any torque-increasing ability. The exact position of the transmission unit 114 within the transmission line 110 is not decisive. However, it is preferred that the transmission unit 114 is positioned after (i.e. downstream) the combustion engine 120 and before (i.e. upstream) the gearbox 118.

In addition, the transmission line 110 is provided with a power transferring means 116 for driving the hydraulic pumps 142, 144, 146 of the hydraulic system 140 to enable the lifting and steering operations mentioned above. The power transferring means 116 may e.g. be gear wheels or some other suitable power transferring means arranged to interact with the transmission line 110 for transferring power from the combustion engine 120 to the hydraulic pumps 142, 144, 146. The power transferring means 116 is preferably arranged to interact with the transmission line 110 in a position upstream the gear box 118 and more preferably in a position between the internal combustion engine 120 and the transmission unit 114

It should be added that the combustion engine 120 can be replaced by other power sources, e.g. a power sources in the form of a gas turbine or even a fuel cell arrangement. In addition, the transmission line 110 may be fully or at least partly replaced by a hydraulic transmission or an electric transmission. An electric transmission may e.g. be implemented by means of cables or similar that supplies power from an electric power source to one or several electric motors for operatively propelling the driving wheels 130. Likewise, the power transferring means 116 may be fully or at least partly replaced by another power transferring unit based on hydraulic or electric principles. For example, the hydraulic pumps 142, 144, 146 may be powered by means of electric motors receiving power from the combustion engine 120 via a generator arrangement or similar.

Electric Machines

As can be seen in FIG. 3 the transmission line 110 is also provided with at least one electric machine 112 or similar torque providing unit arranged to operatively add torque to the transmission line 110 or similar. The electric machine 112 is arranged in a suitable position downstream the combustion engine 120. More preferably, the electric machine 112 is arranged in a suitable position upstream the transmission unit 114 (Ae. preferably at the combustion engine side of the transmission unit 114). Most preferably, the electric machine 112 is arranged in a position between the internal combustion engine 120 and the transmission unit 114. Other alternative positions are conceivable, e.g. between the transmission unit 114 and the gear box 118 and possibly also downstream the gear box 118. The electric machine 112 should preferably be able to operate in at least one quadrant, Ae. as motor in at least one direction of rotation. It may also be preferred that the electric machine 112 operates in at least two quadrants, Ae. as a motor in both clockwise and counter-clockwise direction of rotation. This is particularly advantageous if the electric machine 112 is arranged in a position downstream the gearbox 118, which is able to change between forward and backward driving direction.

The electric machine 112 is coupled to the transmission line 110 so that torque can be exchanged between the transmission line 110 and the electric machine 112. This can be achieve by a plurality of means and functions which are well known to those skilled in the art, e.g. by a mechanic coupling of one or several shafts in the transmission line 110 to the output shaft of the electric machine 112.

A Torque-Control Unit and an Electric Power Source

As can be seen in FIG. 3 the electric machine 112 is connected to a torque-control unit 200 or a similar control unit being arranged to operatively control the torque exchanged between the transmission line 110 and the electric machine 112. It is preferred that the torque-control unit 200 is arranged to operatively provide the machine 112 with electric power from an electric power source 200. This enables the torque-control unit 200 to operate the electric machine 112 as a motor which adds torque to the transmission line 110 for reducing the load on the combustion engine 120.

The electric power source 210 can be designed in many different ways, as long as it is able to provide electricity to the electric machine 112. One alternative is to use a generator powered by a separate combustion engine or similar. However, it is more preferred to use a battery or a super capacitor or even fuel cells and similar alternatives that operate without any separate combustion engine or similar. Here it should be added that the electric machine 112 can be arranged to work as a generator for charging the electric power source 210 when the general load on the combustion engine so permits. Naturally, the charging function of the electric machine 112 is provided in addition to the other functions described herein.

The torque-control unit 200 is preferably implemented as one or several hardware units being arranged in one or several locations within the wheel loader 1 and being provided with the appropriate circuitry and software needed to accomplish the required functions, e.g. circuitry for processing and storing; and software for executing and controlling any required processing and storing.

In addition, it is preferred that the torque-control unit 200 is connected to a CAN-bus or possibly to a MOST-network or any other communication means that is used for connecting different units in the wheel loader 1. Some embodiments may have a very simple torque-control unit 200 comprising a simple on/off switch for connecting the electric machine 112 to the electric power source 210. Other embodiments may have a more sophisticated torque-control unit 200 provided with substantial processing capabilities and advanced switching functions for controlling the electric machine 112 depending on algorithms working on data received from sensors arranged within the wheel loader 1. The sensors may e.g. be pressure sensors and flow sensors for measuring the hydraulic pressure and flow provided by the hydraulic pumps 142, 144, 146. Measured values from these and other sensors in the wheel loader, e.g. sensors for measuring torque and rotational speed etc., are preferably provided to the torque-control unit 200 via a CAN-bus or possibly via a MOST-network or any other communication means that is used for connecting different units in the wheel loader 1.

Function

Above we have discussed the structure of preferred embodiments implemented in a working machine, i.e. in an exemplifying wheel loader 1. Amongst other things, the exemplifying wheel loader 1 comprises an internal combustion engine 120, a working hydraulic system 140, a transmission line 110, an electric machine 112 for adding torque to the transmission line 110 and a torque-control unit 200 for activating the electric machine by providing electric energy from an electric power source 210.

In the introduction it was clarified that there is a particular need for a working machine with an improved ability to meet a transient increase of the load on the working hydraulic system. Hence, the strategy for activating the electric machine 112 to add torque to the transmission line 110 of the wheel loader 1 should be designed so as to reduce the load on the combustion engine 120 upon a transient increase of the load on the working hydraulic system 140.

This requires a strategy for detecting a transient increase of the load on the working hydraulic system 140. It also requires a strategy for determining when the electric machine 112 should be activated to provide additional torque to the transmission line 110. There is also a need for a strategy for determining the amount of torque that should be added to the transmission line 110.

Strategies for Detecting a Transient Increase of the Load

In an embodiment of the present invention it is preferred that the torque-control unit 200, obtains the load on the working hydraulic system 140 in a substantially continuous manner, i.e. it is preferred that the torque-control unit 200 monitors the load on the working hydraulic system 140. In this way it will be possible to detect an increase of the load on the working hydraulic system 140, e.g. by simply comparing the currently obtained load with a load obtained a period earlier. The detected increase of the load on the hydraulic system 140 is equivalent or similar to the first time derivative of the load on the hydraulic system 140. Similarly, it will be possible to detect the rate at which the load on the working hydraulic system 140 is increasing, e.g. by simply comparing the increase currently detected with an increase detected a period earlier. The detected rate at which the load on the hydraulic system 140 is increasing is equivalent or similar to the second time derivative of the load on the hydraulic system 140. Naturally, any suitable and possibly more advanced approach may be used to obtain values corresponding to the indicated first and second time derivatives of the load on the hydraulic system 140. As will be discussed in more detail later, values equivalent or similar to the first and second time derivatives of the load on the hydraulic system 140 can be utilized to determine when and to what extent at least one of the electric machine 112 should be activated to provide additional torque to the transmission line 110.

The torque-control unit 200 may monitor the load on the working hydraulic system 140 in any suitable way known to those skilled in the art.

A typical approach would be to measure the pressure and flow produced by the hydraulic pumps 142, 144, 146 of the working hydraulic system 140. Such measurements can e.g. be obtained by suitable pressure and flow sensors 143, 145, 147 or similar detecting units arranged within the working hydraulic system 140 and connected to the torque-control unit 200 as schematically illustrated in FIG. 3. It is preferred that the sensors 143, 145, 147 are arranged in or near the pumps 142, 144, 146. The obtained measures are preferably provided to the torque-control unit 200 via a CAN-bus or a MOST-network or some other communication means arranged within the wheel loader 1.

As is well known, the pressure and flow produced by a typical hydraulic pump is related to the hydraulic power produced by the pump essentially as given by the following relation:

$$P = p \cdot Q \qquad (1)$$

wherein:
P is the hydraulic power (W),
p is the pressure (Pa)
Q is the flow (m3/s)

In other words, by obtaining a measure of the pressure and flow produced by the hydraulic pumps 142, 144, 146 of the working hydraulic system 140 in FIG. 3 it is possible to obtain a measure of the hydraulic power produced by the pumps 142, 144, 146, which in turn provides a measure of the power required from the combustion engine 120 for driving the pumps 142, 144, 146. Hence, by monitoring the pressure and flow produced by the pumps 142, 144, 146 it is possible to detect a sudden rapid increase of the load on the hydraulic system 140 and to obtain a measure of the increased power require from the combustion engine 120 for driving the pumps 142, 144, 146.

However, measuring the load on the working hydraulic system 140 is in many ways a reactive approach, since it is more or less presupposes that an increase of the load on the hydraulic system 140 is already present. In other words, the approach does not predict an increase of the load In some situations this may have the effect that the torque added to the transmission line 110 by the electric machine 112 is added too late to save the combustion engine 120 from overloading or stalling.

Hence, in another embodiment of the present invention it is preferred that the torque-control unit 200 is arranged to operatively predict an increase of the load on the hydraulic system 140 in FIGS. 2 and 3. This can e.g. be accomplished by monitoring the input commands from the operator of the wheel loader 1 to the hydraulic system 140. A command from an operator to ordinary hydraulic systems, e.g. as the hydraulic systems 140, is always executed with some delay. The delay may e.g. be caused by a transmission of the command, by the execution of the command by pumps and valves and other units in the hydraulic system, and by the natural inertia in the hydraulic system etc. Hence, by monitoring the commands given by an operator of the wheel loader 140 to the hydraulic system 140 it is possible to predict an increase of the load on the hydraulic system 140 before it can be actually measured by sensors such as pressure and flow sensors etc.

The input commands to the exemplifying hydraulic system 140 in FIGS. 2 and 3 can e.g. be monitored by analysing the input command to the hydraulic pumps 142, 144, 146. Such commands are typically given by the operator of the wheel loader 1 utilizing various instruments 220 arranged in the driving compartment of the wheel loader 1 as schematically illustrated in FIG. 3. Naturally, the instruments 220 are connected to the hydraulic system 140 in a well known manner for controlling the pumps 142, 144, 146 etc therein even if this has not been explicitly shown in FIG. 3. The instruments 220 can e.g. be one or several joy-sticks or similar for controlling the hydraulic pumps 142, 144 coupled to the lifting and tilting cylinders 5a, 5b, 6 as described above. The instrument 220 can also be a steering wheel or similar for controlling the pump 146 coupled to the steering cylinders 7a and 7b as described above. Naturally, other instruments for controlling the hydraulic system 140 are clearly conceivable.

As is well known, commands from the instruments 220 mentioned above are typically and preferably available on a CAN-bus or MOST-network or some other communication means arranged within the wheel loader 1. Hence, it is preferred that the torque-control unit 200 is connected to said communication means so as to be able to monitor the commands from the instruments 220. In addition, commands provided from instruments 220 to the hydraulic system 140 are typically and preferably related in a well defined manner to the hydraulic power or similar required by the hydraulic system 140. For example, input commands to the hydraulic pumps 142, 144, 146 may comprise a value corresponding to the hydraulic power that should be produced by the pump in question.

Given the above it should be clear that providing the torque-control unit 200 with the commands transmitted from the instruments 220 to the hydraulic system 140 enables the torque-control unit 200 to obtain a measure of the hydraulic power or similar that the hydraulic system 140 is supposed to produce in the next instant. In other words the torque-controller 200 will be able to predict an increase of the load on the working hydraulic system 140, e.g. by simply comparing the current command with a command given a period earlier. Predicting an increase of the load on the working hydraulic system 140 is equivalent or similar to predicting the first time derivative of the load on the working hydraulic system 140. Similarly, torque-controller 200 will be able to predict the rate at which the load on the working hydraulic system 140 will increase in the next instant, e.g. by simply comparing the predicted increase currently obtained with an increase obtained a period earlier. Predicting the rate at which the load on the working hydraulic system 140 will increase is equivalent or similar to predicting the second time derivative of the load on the hydraulic system 140. Naturally, any suitable and possibly more advanced approach may be used to obtain values corresponding to the indicated predicted first and second time derivatives of the load on the hydraulic system 140.

It should be added that the expression "detecting" a transient increase of the load on the working hydraulic system 140 comprises detecting by means of calculating, i.e. the detecting units are not necessarily sensors or similar. On the contrary, the detecting unit or units may e.g. be implemented as algorithms or similar run by software or similar.

Strategies for Determining when an Electric Machine Should be Activated

Various strategies have been given above for detecting an increase of the load on the working hydraulic system 140. Proceeding from these detecting-strategies we will now discuss various strategies for determining when torque should be added to the transmission line 110 by activating the electric machine 112.

In an embodiment of the invention the electric machine 112 is activated to provide additional torque to the transmission line 110 when the increase—e.g. measured or predicted—of the load on the hydraulic system 140 reaches a predetermined value. This is equal or similar to activating the electric machine 112 to provide additional torque to the transmission line 110 when the first time derivative of the load on the hydraulic system 140 has reached a predetermined value.

In another embodiment of the invention the electric machine 112 is activated to provide additional torque to the transmission line 110 when the rate of the increase—e.g. measured or predicted—of the load on the hydraulic system 140 reaches a predetermined value. This is equal or similar to activating the electric machine 112 to provide additional torque to the transmission line 110 when the second time derivative of the load on the hydraulic system 140 has reached a predetermined value.

In a more preferred embodiment of the invention the electric machine 112 is activated to provide additional torque to the transmission line 110 when the average increase—e.g. measured or predicted—of the load on the hydraulic system 140 during a predetermined period reaches a predetermined value.

This is preferred so as to avoid that any of the electric machine 112 is activated at transient loads having a very short duration, e.g. in the range of one or several microseconds or possibly one or several millisecond or possibly longer in some applications. Such transient loads are typically neutralized by the natural inertia of the combustion engine 120 and the transmission line 110 of the wheel loader 1. This is usually the case even if the short transient load is fairly high. Some working machines are even provided with a flywheel coupled to the transmission line for neutralizing such transient loads or similar.

From this it is clear to those skilled in the art that the exemplifying electric machine 112 shown in FIG. 3 must not necessarily be activated at a transient load if it can be neutralized by e.g. the natural inertia provided by the combustion engine 120 and the transmission line 110 and a possible flywheel of the wheel loader 1 etc. Hence, the magnitude and duration of the transient loads that may be ignored follows from the design of the working machine in question The other way around, the magnitude and duration of the transient loads that are advantageously taken care of according to embodiments of the present invention follow in the same way from the design of the working machine in question. The specific magnitude and duration of transient loads that are advantageously taken care of according to embodiments of the present invention can be obtained by calculations and/or by empirical tests.

Figure 4:
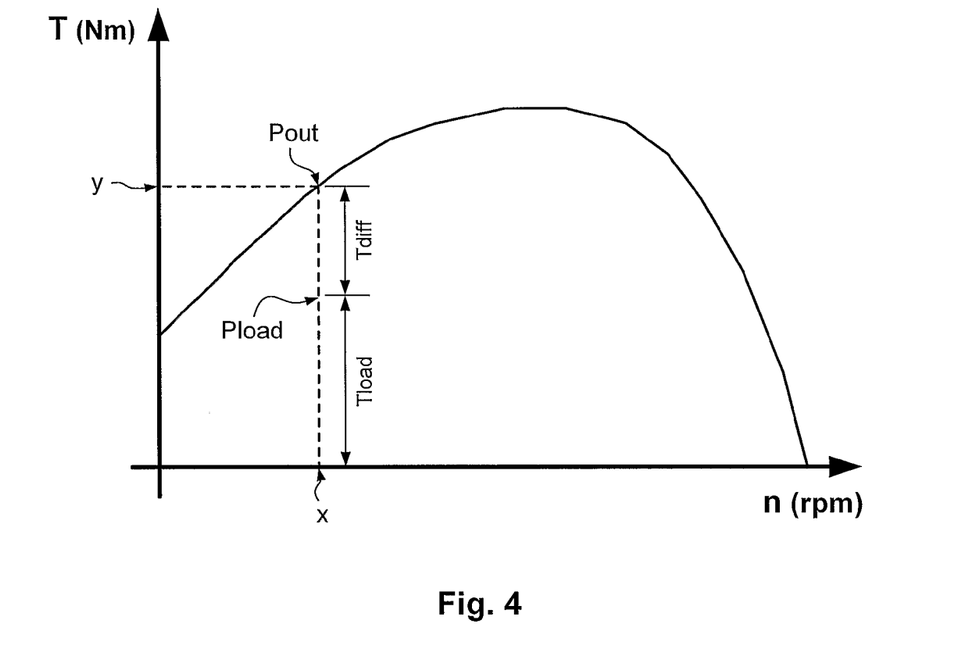
FIG. 4 is a diagram which schematically illustrates the torque produced at different rotation speeds for an exemplifying combustion engine.

The fact that the electric machine 112 must not necessarily be activated at every transient load is particularly evident when the torque-control unit 200 predicts the increase and/or the rate of the increase of the load on the hydraulic system 140. FIG. 4 shows a diagram with a graph that schematically illustrates the torque T (Nm) produced at different rotational speeds n (rpm) for the exemplifying combustion engine 120. The torque T and the rotational speed n correspond to an available output power from the combustion engine 120 according to the general and well known relation P(W)=T(Nm) kn(rpm), wherein k is a constant for converting rotations per minute (rpm) to radians per second (rad/s). For example, assume that an operator of the wheel loader 1 runs the engine 120 at a rotational speed of x (rpm) giving an available output torque of y (Nm) and an available output power Pout from the combustion engine 120. However, let us assume that the current load Pload on the engine 120 is a fraction of the currently available output power Pout. This enables the engine 120 to respond to an increased load on the hydraulic system 140 within a load margin of Pdiff=Pout−Pload without having to increase the rotational speed x (rpm). Expressed in another way, this enables the engine 120 to respond to an increased load within a torque load margin of Tdiff=Tout−Tload without having to increase the rotational speed x (rpm) as indicated in FIG. 4. Hence, the electric machine 112 does not have to be activated for providing additional torque to the transmission line 110 as long as a predicted increase of the load on the hydraulic system 140 is less than the current load margin Pdiff. The other way around, the electric machine 112 is preferably activated to provide additional torque to the transmission line 110 when the predicted increase of the load on the hydraulic system 140 exceeds the current load margin Pdiff. Alternatively, the electric machine 112 is preferably activated to provide additional torque to the transmission line 110 when the predicted increase of the load on the hydraulic system 140 exceeds a percentage of the current load margin Pdiff, e.g. a percentage in the interval of about 50%-90% of the current load margin Pdiff.

This is to ensure that there is still a sufficient margin for an additional increase of the load on the combustion engine 120 caused by other systems of the wheel loader 1.

Strategies for Determining the Amount of Torque that Should be Added

We have now discussed preferred strategies for determining when torque should be added to the transmission line 110 by the electric machine 112. Next we will discuss the amount of torque that should be added to the transmission line 110 by the electric machine 112.

In one embodiment of the invention the electric machine 112 is activated to add a predetermined amount of torque to the transmission line 110 to reduce a sudden rapid increase of the load on the hydraulic system 140. The predetermined amount may e.g. be the maximum power of the electric machine 112 or a predetermined fraction of that power. This is similar or equal to an all-or-nothing function or an on/off function. The simplicity of this function is a clear advantage. However, a drawback is that the added amount of torque has no significant correlation with the increase of the load on the hydraulic system 140. Hence, the added amount of torque may be too small or too large to neutralize the increase. A small amount may give an insufficient support for the combustion engine 120. A large amount may disturb other functions in the wheel loader 1.

Hence, in another embodiment of the invention it is preferred that the electric machine 112 is activated to add an amount of torque to the transmission line 110 so that the increase—e.g. measured or predicted—of the load on the hydraulic system 140 is neutralized or at least substantially neutralized. Naturally, this can be accomplished by adding an amount of power that equals or correspond to the increase of the load on the hydraulic system 140. In one embodiment this is achieved by adding an amount of power that equals or correspond to the first time derivative of the load on the hydraulic system 140. Alternatively, this may be accomplished by adding an amount of power that equals or correspond to the rate of the increase of the load on the hydraulic system 140. In one embodiment this is achieved by adding an amount of power that equals or correspond to the second time derivative of the load on the hydraulic system 140.

However, the amount of torque that is added to the transmission line 110 by the electric machine 112 in the embodiments described above is essentially depending on the increase of the load on the hydraulic system 140. In other words, the added torque has no significant correlation with the current working point of the combustion engine 120.

Hence, given a current working point for the combustion engine 120 at a rotational speed of x (rpm) providing an available output torque of y (Nm) and an available output power Pout from the combustion engine 120, as discussed above with reference to FIG. 4. Then the amount of torque added to the transmission line 110 should be of such an amount so that the predicted transient increase of the load on the hydraulic system 140 is not exceeding the current load margin Pdiff. Alternatively, the amount of torque added to the transmission line 110 should be of such an amount so that the predicted transient increase of the load on the hydraulic system 140 is not exceeding a predetermined percentage of the current load margin Pdiff, e.g. a percentage in the interval of about 50%-80% of the current load margin Pdiff.

Here it should be added that the rotational speed of the combustion engine 120 is preferably increased in a controlled manner to meet the transient increase of the load on the hydraulic system 140, i.e. in a manner that gives in a minimum of environmental pollution and that does not overload or stall the engine 120. This can e.g. be achieved by the torque-control unit 200 transmitting a message via a CAN-bus to an engine ECU (Electronic Control Unit) or similar unit for controlling the combustion engine 120 in the wheel loader 1. There are a wide variety of well known engine ECUs that are frequently used by those skilled in the art for controlling combustion engines, e.g. for controlling such parameters as the torque and rotational speed provided by the engine These well known ECUs needs no further description.

In addition, the torque-control unit 200 is preferably arranged to reduce the amount of torque that is added to the transmission line 110 by the electric machine 112 when the rotational speed of the engine 120 is increased to meet the transient increase of the load on the hydraulic system 140, since an increased rotational speed for the engine 120 leads to an increased margin with respect to engine overload and possible stall etc.

Additional Embodiments

Although the exemplifying hydraulic system 140 illustrated in FIG. 2-3 has three hydraulic pumps 142, 144, 146 other embodiments may have one, two, four or more hydraulic pumps. In a preferred embodiment of the invention the working machine has at least two implement and/or steering functions, and at least one said hydraulic pump is arranged for each implement and/or steering function.

As described in connection to the FIG. 1, the working machine 1 can have an implement 2 in the form of a bucket 3 which is operated by means of the hydraulic system 140. However, it should be emphasised that other implements are usable. When applying the invention on a working machine such as an articulated hauler or a truck, the implement can instead be for example a dump body. Usually a hydraulic pump and working cylinders are used for the operation of the dump body during the dumping movement.

It is to be understood that the present invention is not limited to the embodiments described above and illustrated in the drawings; rather, the skilled person will recognize that many changes and modifications may be made within the scope of the appended claims.

The invention claimed is:

1. A method for operating a working machine provided with: a power source and a plurality of driving wheels; a working hydraulic system comprising at least one hydraulic pump powered by the power source for at least one of moving an implement on the working machine and steering the working machine; a transmission line arranged between the power source and the driving wheels for transmitting torque from the power source to the driving wheels, comprising:
    detecting at least one operational parameter indicative of a load exerted on the working hydraulic system,
    determining if torque needs to be added, in addition to a torque delivered by the power source, on the basis of a magnitude of the detected operational parameter in order to reduce a load on the power source,
    adding torque in case additional torque is determined to be needed.

2. A method according to claim 1, comprising: adding the torque upon the detection of a transient increase of the load on the working machine.

3. A method according to claim 2, comprising: temporarily adding the torque during the transient increase of the load on the working hydraulic system.

4. A method according to claim 1, comprising: adding the torque to the transmission line.

5. A method according to claim 1, comprising: using at least one electric machine for adding the torque.

6. A method according to claim 5, comprising: using a control unit (200) for activating the electric machine to add the torque.

7. A method according to claim 5, comprising: using the electric machine arranged upstream a transmission unit arranged in the transmission line, or upstream a gearbox arranged in the transmission line.

8. A method according to claim 1, comprising: detecting the load on the working hydraulic system by measuring at least one of a pressure or flow produced by the hydraulic system.

9. A method according to claim 1, comprising: predicting the load on the working hydraulic system by monitoring at least one input command to the hydraulic system.

10. The method according to claim 1, comprising: adding the torque when a detected transient increase of the load on the hydraulic system reaches a predetermined value.

11. The method according to claim 10, comprising: adding an amount of torque so that the load imposed on the power source by a transient increase of the load on the hydraulic system is neutralized or substantially neutralized.

12. The method according to claim 1, comprising: adding the torque when the rate of the transient increase of the load on the hydraulic system reaches a predetermined value.

13. The method according to claim 1, comprising: adding the torque when the average of the transient increase of the load on the hydraulic system detected during a predetermined period reaches a predetermined value.

14. The method according to claim 1, comprising: adding the torque when the transient increase of the load on the hydraulic system exceeds a current load margin ) is defined by the currently available output power (Pout) from the power source reduced by the current load (Pload)) on the power source.

15. The method according to claim 14, comprising: adding an amount of torque so that the predicted transient increase of the load on the hydraulic system does not exceed the current load margin (Pdiff).

16. The method according to claim 1, comprising: adding the torque when the transient increase of the load on the hydraulic system exceeds a predetermined percentage of a current load margin (Pdiff), which load margin (Pdiff) is defined by the currently available output power (Pout) from the power source reduced by the current load (Pload)) on the power source.

17. The method according to claim 16, comprising: adding an amount of torque so that the predicted transient increase of the load on the hydraulic system does not exceed a predetermined percentage of the current load margin (Pdiff).

18. The method according to claim 1, comprising: adding a predetermined amount of torque to the transmission line.

19. The method according to claim 18, comprising: increasing the rotational speed of the power source to meet the transient increase in a controlled manner.

20. The method according to claim 18, comprising: reducing the added amount of torque as the rotational speed of the power source increases to meet the transient increase in a controlled manner.

21. A method according to claim 1, the power source is mechanically connected to the working hydraulic system.

22. A method according to claim 1, the power source is an internal combustion engine.

23. The method according to claim 1, wherein the operated working machine is a wheel loader.

24. A working machine provided with: a power source and a plurality of driving wheels; a working hydraulic system comprising at least one hydraulic pump powered by the power source for at least one of moving an implement on the working machine and steering the working machine; a transmission line arranged between the power source and the driving wheels for transmitting torque from the power source to the driving wheels, comprising:
- at least one detecting unit for detecting at least one operational parameter indicative of a load exerted on the working hydraulic system,
- at least one control unit for determining if torque needs to be added, in addition to a torque delivered by the power source, on the basis of a magnitude of the detected operational parameter in order to reduce a load on the power source,
- at least one torque providing unit controlled by the control unit for adding torque in case additional torque is determined to be needed.

25. A working machine according to claim 24, wherein: the torque providing unit is arranged to operatively add the torque upon the detection of a transient increase of the load on the working machine.

26. A working machine according to claim 25, wherein: the torque providing unit is arranged to temporarily add the torque during the transient increase of the load on the working hydraulic system.

27. A working machine according to claim 24, wherein: the torque providing unit is arranged to operatively add the torque to the transmission line.

28. A working machine according to claim 24, wherein: the torque providing unit comprises least one electric machine.

29. A working machine according to claim 28, wherein: the electric machine is arranged to be operatively activated to add the torque by the control unit.

30. A working machine according to claim 28, wherein: the electric machine is arranged upstream a transmission unit arranged in the transmission line, or upstream a gearbox arranged in the transmission line.

31. A working machine according to claim 24 wherein: at least one detecting unit is arranged to operatively measure at least one of a pressure or flow produced by the hydraulic system.

32. A working machine according to claim 24 wherein: the control unit is arranged to operatively predict the load on the working hydraulic system by monitoring at least one input command to the hydraulic system.

33. A working machine according to claim 24 wherein: the power source is mechanically connected to the working hydraulic system.

34. A working machine according to claim 24 wherein: the power source is an internal combustion engine.

35. A working machine according to claim 24 characterized in that the operated working machine is a wheel loader.

* * * * *